United States Patent
Kimura

(10) Patent No.: US 8,199,351 B2
(45) Date of Patent: Jun. 12, 2012

(54) INFORMATION PROCESSING SYSTEM, INFORMATION PROCESSING METHOD, AND COMPUTER-READABLE RECORDING MEDIUM

(75) Inventor: Jun Kimura, Tokyo (JP)

(73) Assignee: Ricoh Comany, Ltd., Tokyo (JP)

( * ) Notice: Subject to any disclaimer, the term of this patent is extended or adjusted under 35 U.S.C. 154(b) by 659 days.

(21) Appl. No.: 12/372,833

(22) Filed: Feb. 18, 2009

(65) Prior Publication Data

US 2009/0207443 A1 Aug. 20, 2009

(30) Foreign Application Priority Data

Feb. 20, 2008 (JP) ................................. 2008-039220

(51) Int. Cl.
*G06F 3/12* (2006.01)

(52) U.S. Cl. ....... 358/1.15; 358/1.9; 358/1.16; 709/203; 709/223; 379/93.32

(58) Field of Classification Search ................ 358/1.15, 358/1.16, 501, 1.9, 1.18; 709/203, 217, 246, 709/224, 223; 379/93.1, 93.31, 93.32
See application file for complete search history.

(56) References Cited

U.S. PATENT DOCUMENTS

| | | | |
|---|---|---|---|
| 6,405,366 B1 * | 6/2002 | Lorenz et al. | 717/107 |
| 6,754,181 B1 * | 6/2004 | Elliott et al. | 370/252 |
| 7,509,679 B2 * | 3/2009 | Alagna et al. | 726/24 |
| 7,577,848 B2 * | 8/2009 | Schwartz et al. | 713/187 |
| 7,869,425 B2 * | 1/2011 | Elliott et al. | 370/352 |
| 8,103,702 B2 * | 1/2012 | Takemoto | 707/803 |
| 2003/0137691 A1 * | 7/2003 | Tanaka | 358/1.15 |
| 2005/0157321 A1 * | 7/2005 | Alacar | 358/1.13 |
| 2005/0162678 A1 | 7/2005 | Nakata | |
| 2005/0166184 A1 * | 7/2005 | Takao | 717/117 |
| 2006/0221368 A1 | 10/2006 | Higuchi | |
| 2008/0068655 A1 | 3/2008 | Kimura | |
| 2008/0077944 A1 * | 3/2008 | Seely | 719/329 |
| 2008/0095339 A1 * | 4/2008 | Elliott et al. | 379/93.01 |
| 2011/0023024 A1 * | 1/2011 | Masuda | 717/176 |
| 2011/0234854 A1 * | 9/2011 | Kimura | 348/231.99 |

FOREIGN PATENT DOCUMENTS

| | | |
|---|---|---|
| JP | 2005-208895 | 8/2005 |
| JP | 2006-306021 | 11/2006 |

\* cited by examiner

*Primary Examiner* — Negussie Worku
(74) *Attorney, Agent, or Firm* — IPUSA, PLLC

(57) ABSTRACT

A client apparatus is coupled to a server apparatus via a network in an information processing system. In the server apparatus, installing of a plug-in file in a first storage apparatus is detected, binary image data of the detected plug-in file are written to a first storage area, and the binary image data of the plug-in file is copied to the client apparatus. In the client apparatus, copying of the binary image data of the plug-in file in a second storage area is detected, the binary image data of the plug-in file stored in the second storage area is written in an executable state within a second storage apparatus, and the plug-in file in the second storage apparatus is read as a program.

20 Claims, 8 Drawing Sheets

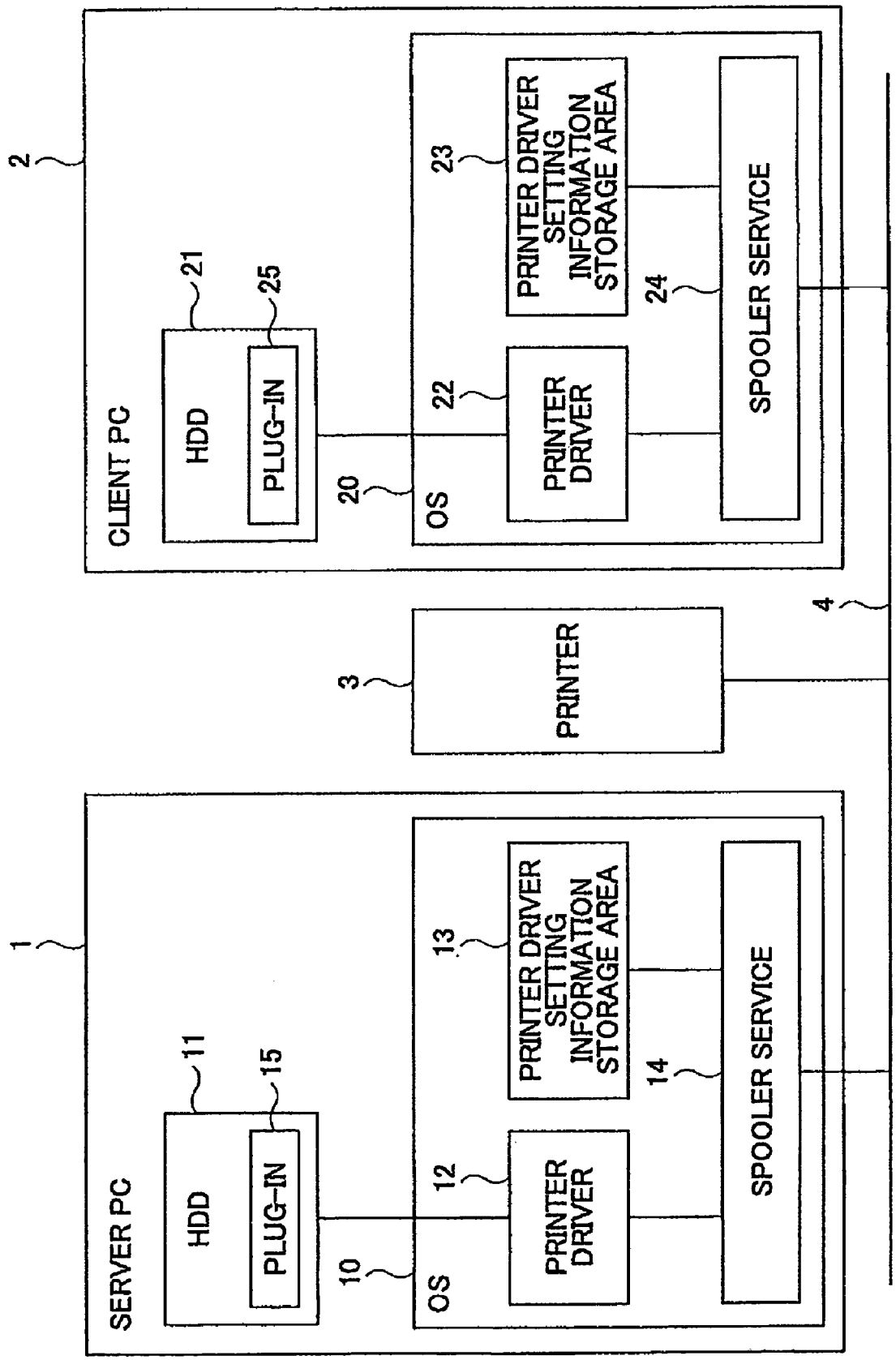

FIG.4

| FILE NAME |
| --- |
| "PluginFile. DLL" |

| FILE CREATION DATE |
| --- |
| xxxx/xx/xx |

BINARY IMAGE DATA OF PLUG-IN FILE

FIG.6

| |
|---|
| FILE NAME<br>"PluginFile. DLL" |
| FILE CREATION DATE<br>xxxx/xx/xx |
| OBJECTIVE OS<br>"WINDOWS 2000" |
| BINARY IMAGE DATA OF PLUG-IN FILE |

INFORMATION PROCESSING SYSTEM, INFORMATION PROCESSING METHOD, AND COMPUTER-READABLE RECORDING MEDIUM

BACKGROUND OF THE INVENTION

1. Field of the Invention

The present invention generally relates to an information processing system constituted by an information processing apparatus including a personal computer, an information processing method of the information processing system, and a computer-readable recording medium having instructions executable by a computer to execute the information processing method.

2. Description of the Related Art

As an example of an operating system (OS) running in an information processing apparatus such as a computer, there is the Windows (registered trademark) by Microsoft Corporation which includes a function called "Point & Print" (registered trademark, referred to as "P&P" in the following) for enabling plural client personal computers (PCs) (also referred to as "clients" in the following) to use a printer directly connected to a server PC (also referred to as "server" in the following) via a network, or to use the printer as a shared printer which is connected to the network.

The P&P is a function which enables a printer driver of the printer to be automatically transmitted from the server to the clients and the clients to install the transmitted printer driver of the printer. In this way, it becomes possible for each of the clients in the network to use the printer described above without the need to install the printer driver of the printer.

There is known a printer driver described above which can add a new (or additional) function to the installed printer driver. A small scale program for adding the new function to the printer driver is called a plug-in.

However, in the operation of a conventional P&P described above, even if a module of a new plug-in is added and installed to the printer driver of the server, the server does not transmit the module of the new plug-in automatically to each of the clients. In this case, there is a problem that each of the clients cannot use the function of the new plug-in without installing the module of the new plug-in to each of the clients.

Recently, an information processing apparatus has been proposed in a Japanese Patent Application Publication No. 2005-208895, in which a module called an add-in installer for adding an add-in corresponding to the plug-in module described above accesses a print service of the OS of the server, registers an additional add-in module for the configuration information of the print service, and copies the add-in module from the server to the printer driver of the client through the print service with respect to the client.

However, the information processing apparatus described above needs to add the add-in installer, and further, after an add-in module of the add-in installer is installed, the update of configuration information of the print service of the server and a reboot process of the print service are necessary. Since the print process cannot be performed during the reboot process, it is difficult to add the plug-in to the client in an environment where an interruption of the print service for the client is not permitted.

SUMMARY OF THE INVENTION

It is a general object of the present invention to provide a novel and useful information processing system, information processing method and computer-readable recording medium, in which the problem described above is minimized.

One aspect of the present invention is to provide an information processing system, an information processing method and a computer-readable recording medium, which enable functions of a plug-in added to a driver in a server apparatus to be added and used in a client apparatus without having to re-install the driver in the client apparatus.

According to one aspect of the present invention, there is provided an information processing system comprising a sever apparatus; and at least one client apparatus coupled to and communicatable with the server apparatus via a network; said server apparatus comprising a first storage apparatus; a first detection unit configured to detect installing of a plug-in file in the first storage apparatus; a first storage area; a first writing unit configured to write binary image data of the plug-in file detected by the first detection unit to the first storage area; and a copy unit configured to copy the binary image data of the plug-in file written in the first storage area by the first writing unit to the client apparatus, said client apparatus comprising a second storage apparatus; a second storage area; a second detection unit configured to detect copying of the binary image data of the plug-in file in the second storage area; a second writing unit configured to write the binary image data of the plug-in file stored in the second storage area in an executable state within the second storage apparatus; and a read unit configured to read the plug-in file written in the second storage apparatus by the second writing unit as a program.

According to another aspect of the present invention, there is provided an information processing method comprising detecting installing of a plug-in file in a first storage apparatus within a server apparatus; writing binary image data of the detected plug-in file to a first storage area within the sever apparatus; copying the binary image data of the plug-in file written in the first storage area to a second storage area within at least one client apparatus which is coupled to and communicatable with the server apparatus via a network; detecting copying of the binary image data of the plug-in file in the second storage area; writing the binary image data of the plug-in file stored in the second storage area in an executable state within a second storage apparatus within the client apparatus; and reading the plug-in file written in the second storage apparatus as a program.

According to another aspect of the present invention, there is provided a computer-readable recording medium on which a program which, when executed by a computer, causes the computer to perform a process comprising a first detection procedure detecting installing of a plug-in file in a first storage apparatus within a server apparatus; a first writing procedure writing binary image data of the plug-in file detected by the first detection procedure to a first storage area within the server apparatus; a copy procedure copying the binary image data of the plug-in file written in the first storage area by the first writing procedure to at least one client apparatus which is coupled to and is communicable with the server apparatus via a network; a second detection procedure detecting copying of the binary image data of the plug-in file in the second storage area; a second writing procedure writing the binary image data of the plug-in file stored in the second storage area in an executable state within the second storage apparatus; and a read procedure reading the plug-in file written in the second storage apparatus by the second writing procedure as a program.

Other objects, features and advantages of the present invention will become more apparent from the following detailed description when read in conjunction with the accompanying drawings.

BRIEF DESCRIPTION OF THE DRAWINGS

FIG. 1 is a block diagram showing the structure of an information processing system of an embodiment of the present invention;

FIG. 4 is an illustration indicating a data format which is used when a plug-in file is written in the printer driver setting information storage areas shown in FIGS. 2A and 2B;

FIG. 6 is an explanatory drawing showing another file format to be used when a plug-in file is written in the printer driver setting information storage areas shown in FIGS. 2A and 2B;

DETAILED DESCRIPTION OF THE PREFERRED EMBODIMENTS

In the following, the preferred embodiments for achieving the present invention will be described with accompanying drawings.

FIG. 1 is a block diagram showing the structure of an information processing system of an embodiment of the present invention.

Figure 2A:
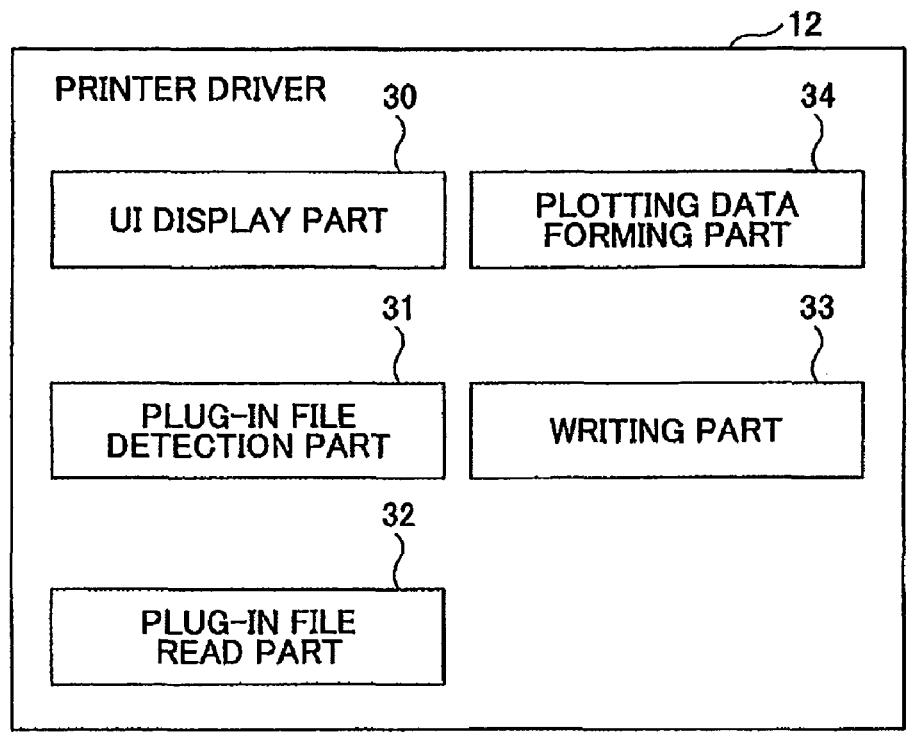
FIGS. 2A through 2B are block diagrams respectively showing the functional structures of the printer drivers for a server PC and a client shown in FIG. 1.
Figure 2B:
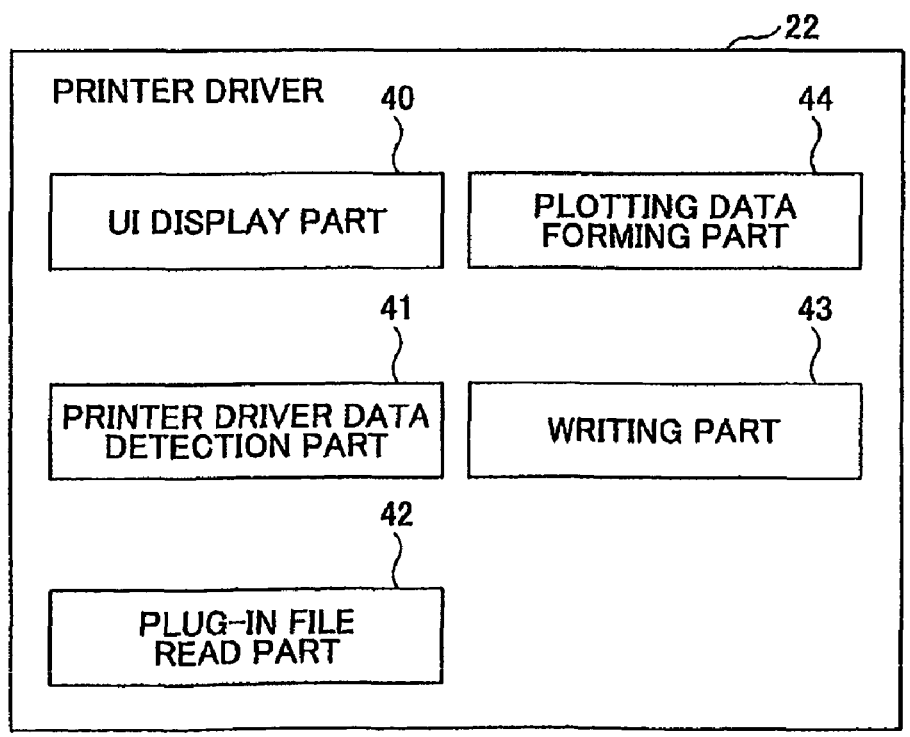

FIGS. 2A through 2B are block diagrams showing the functional structures of the printer drivers for a server personal computer (PC) and a client respectively indicated in FIG. 1.

As indicated in FIG. 1, the information processing system includes a server PC 1 which forms a server apparatus, and includes client PCs 2 which form plural client apparatuses. The server PC 1 and each of the client PCs 2 are connected via a network 4 and can perform data communication one another. Also, a printer 3 connected to the network 4 is open to each of the client PCs 2 via the server PC 1 as a shared printer. The server PC 1 performs a function of a print server system, in which the server PC 1 manages print data input from the client PCs 2 and prints the print data using the printer 3.

It should be noted that only a single client PC 2 is presented in FIG. 1 for the sake of convenience, and the illustration of other client PCs 2 are omitted in FIG. 1.

The server PC 1 and each of the client PCs 2 may be personal computers, for example. The printer 3 may be any kind of apparatus having a printing function, including a laser printer, a copying apparatus and a multifunction peripheral (MFP). The network 4 may be a communication network including a local area network and the Internet. The server PC 1 is provided with parts including an operating system (OS) 10 and a storage apparatus such as a hard disk drive (HDD) 11. The operations of the OS 10 are performed by executing control programs stored on the HDD 11 by a microcomputer including a central processing unit (CPU), a read only memory (ROM) and a random access memory (RAM) of the server PC 1. The OS 10 is a functional part that controls the entire server PC 1. The OS 10 also includes a printer driver 12, a printer driver setting information storage area 13, and a spooler service 14 as functional parts related to printing.

By causing the CPU to execute a program according to the present invention, which is included in the control programs described above, the information processing method of the present invention is performed, and each of functions of the information processing system of the present invention is achieved.

On the other hand, the client PC 2 includes an OS 20, a storage apparatus such as a hard disk drive (HDD) 21. The operation of the OS 20 is performed by executing control programs stored on the HDD 21 by a microcomputer including a CPU, a ROM and a RAM of the client PC 2. The OS 20 is a functional part that controls the whole client PC 2. The OS 20 also includes a printer driver 22, a printer driver setting information storage area 23, and a spooler service 24 for functional parts of printing similar to the case of the OS 10 described above.

The OS 10 and the OS 20 may be, for example, any type of OS including the Windows OS provided by Microsoft Corporation. In the following, descriptions will be given for a case where the Windows OS by Microsoft Corporation is used.

In FIG. 1, only the functional parts related to printing are indicated, and illustration and description of other functional parts are omitted.

The printer drivers 12 and 22 perform print control related to printing, respectively. The printer driver setting information storage areas 13 and 23 are memory areas respectively provided by the OSs 10 and 20, and are shared by the server PC 1 and the client PC 2. The printer driver setting information storage areas 13 and 23 correspond to data area called "printer driver data area" which is a function provided by the printer driver of the Windows.

The spooler services 14 and 24 provide transmission of print data generated by each of the printer drivers 12 and 22 to the printer 3, installation of printer drivers 12 and 22, and an application program interface (API) for using the P&P function. The printer drivers 12 and 22 execute processes via the API.

In the information processing system, the server PC 1 automatically installs the same printer driver installed in the server PC 1 into the client PC 2 by use of the P&P function described above when the client PC 2 makes a setting to use the printer 3 as a shared printer with respect to the server PC 1.

Further, if a plug-in file of the print function is installed in a specific folder within the HDD 11, the printer driver 12 of the OS 10 of the server PC 1 reads the plug-in file from the specific folder in the HDD 11 and adds the print function by executing the plug-in file when displaying a user interface (UI) with respect to a display part (not shown) or when printing is performed by the printer 3.

Likewise, in the client PC 2, if a plug-in file of the print function is installed in a specific folder within the HDD 21, the printer driver 22 of the OS 20 of the client PC 2 reads the plug-in file from the specific folder in the HDD 21 and adds the print function by executing the plug-in file when displaying a UI on a display part (not shown) or when printing is performed by the printer 3 via the server PC 1.

In the Windows by Microsoft Corporation, the plug-in file described above is generally provided in the form of a module called a dynamic link library (DLL). When reading and using the DLL within the programs of the printer drivers 12 and 22, the DLL cannot be used if the DLL merely exists as a memory image, and there is a requirement that the DLL must be written on hard disks of the HDDs 11 and 22.

Information necessary for the operation of a printer driver developed by each printer manufacturer of the printer to be used by a computer operating on the Windows OS can be registered at any time in the printer driver setting information storage areas 13 and 23.

Normally, the printer driver setting information storage areas 13 and 23 are used to store the setting information of a printer driver user interface (UI), however, there is no restriction on the information storable in the printer driver setting information storage areas 13 and 23.

Further, under the P&P environment of the OS 10 and the OS 20, a synchronizing process is performed so that the same information is held in the printer driver setting information storage areas 13 and 23 of the server PC 1 and the client PC 2.

In the information processing system, information (data) stored in the printer driver setting information storage area 13 of the server PC 1 is automatically transmitted to the client PC 2 by the process of the spooler service 14 under the control of the OS 10, and is copied to the printer driver setting information storage area 23 by the spooler service 24 of the client PC 2. Therefore, the printer drivers 12 and 22 can always perform the print control by referring the same content of printer driver setting information.

Further, when the plug-in file 15 is installed in the specific folder within the HDD 11, the printer driver 12 of the server PC 1 writes the plug-in file 15 in the printer driver setting information storage area 13 as binary image data, and thereafter copies the binary image data of the plug-in file 15 to the printer driver setting information storage area 13 to the driver setting information storage area 23 of the client PC 2 by the synchronizing process described above.

On the other hand, the printer driver 22 of the client PC 2 writes the binary image data of the plug-in file 15 copied to the printer driver setting information storage area 23 by the server PC 1 to the specific folder in the HDD 21 as an executable file.

In this manner, similar to the server PC 1, the plug-in can be used in the client PC 2 by performing a module reading process with respect to the plug-in file 25 stored in the specific file within the HDD 21.

Accordingly, it becomes possible for client PCs to use the same plug-in file as that of the server PC by merely installing the plug-in file to the server PC, in an environment where only the functions of printer drivers initially provided by the operating system (OS) are available for use.

Next, a description will be given of a process of the information processing system which enables the plug-in file of the server PC 1 to be also used by the client PC 2.

Figure 3:
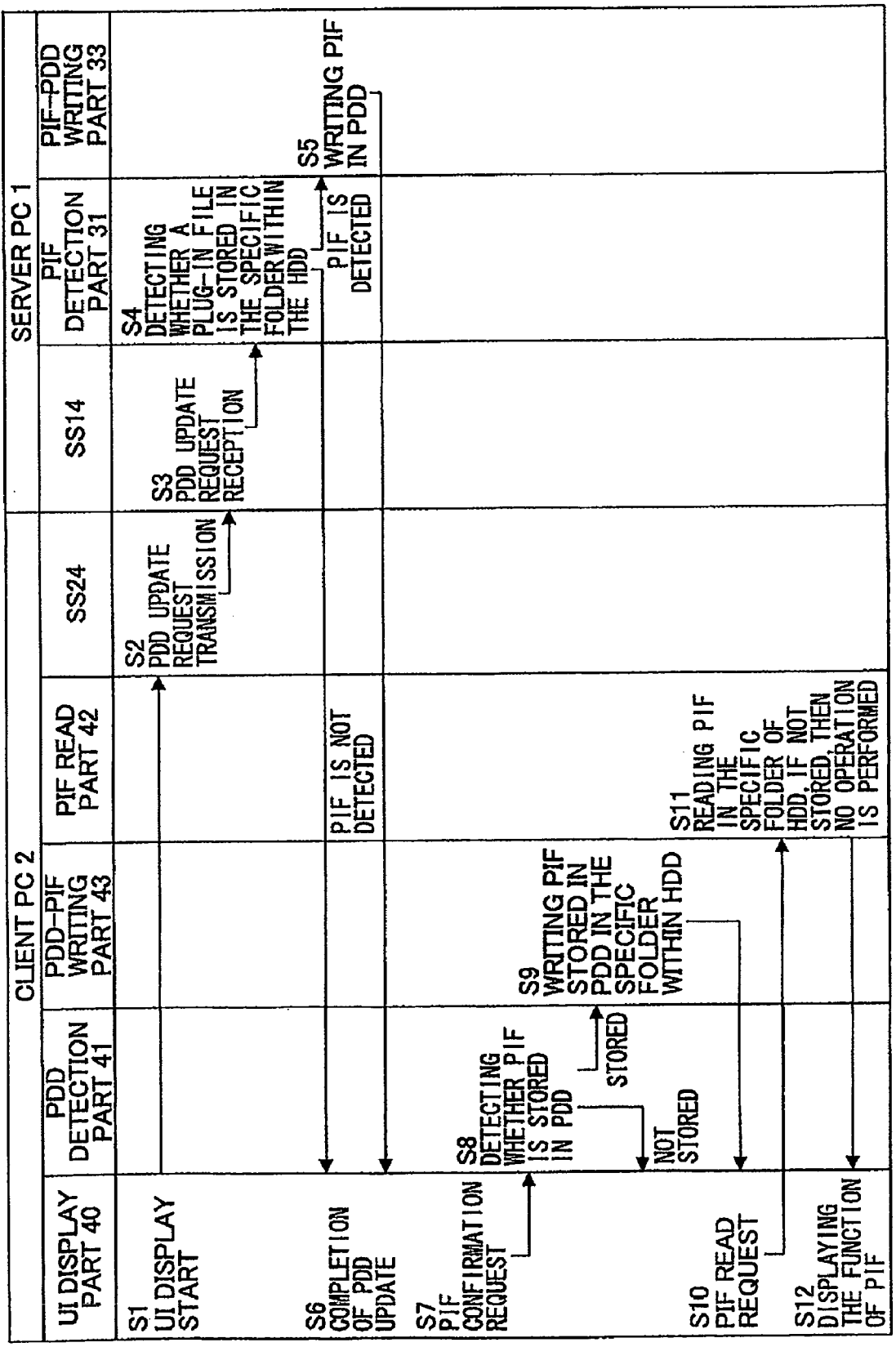
FIG. 3 is a sequence diagram for explaining a process of the information processing system illustrated in FIG. 1 enabling the client PC to use the plug-in file of the server PC.

FIG. 3 is a sequence diagram for explaining a process of the information processing system illustrated in FIG. 1 which also enables the client PC 2 to use the plug-in file of the server PC 1.

When a UI display part 40 starts displaying a UI display on a display part (not shown) or when a plotting data forming part 44 performs a print process in step S1, the printer driver 22 of the client PC 2 transmits a PDD (printer driver data) update request which request updating of the printer driver setting information storage area 23 to the server PC 1 by the spooler service 24 (indicated as "SS24") in step S2.

When the server PC 1 receives the PDD update request transmitted from the client PC 2 by the spooler service 14 (indicated as "SS14") in step S3, the spooler service 14 transmits the PDD update request to the printer driver 12. When the printer driver 12 receives the PDD update request, the printer driver 12 detects whether a plug-in file (indicated as "PIF" in FIG. 3) is stored in the specific folder within the HDD 11 in step S4 by a plug-in file detection part 31 (indicated as "PIF detection part 31"). This plug-in file detection part 31 forms a first detection unit which detects installing of a plug-in file in the HDD 11.

When the plug-in file detection part 31 detects that the plug-in file 15 of the printer driver 12 is installed in the specific folder within the HDD 11, the plug-in file detection part 31 transmits a write request to a writing part 33 (indicated as "PIF-PDD writing part 33") to request writing of the plug-in file to the printer driver setting information storage area 13. The writing part 33 forms a first writing unit which writes binary image data of the plug-in file detected by the plug-in file detection part 31 to the printer driver setting information store area 13.

When the write request requesting the writing of the plug-in file is received from the plug-in file detection part 31, the writing part 33 reads the plug-in file 15 which is installed in the specific folder within the HDD 11 in the form of the binary image data and writes the binary image data of the plug-in file 15 in the printer driver setting information storage area 13 in step S5.

The UI display part 40 of the client PC 2 displays the end of the PDD update in step S6.

Further, the binary image data of the plug-in file 15 written in the printer driver setting information storage area 13 are also copied to the printer driver setting information storage area 23 of the client PC 2 by the function of the spooler service 14. This spooler 14 forms a copy unit which copies the binary image data of the plug-in file written in the printer driver setting information storage area 13 to the printer driver setting information store area 23.

In step S7, the UI display part 40 of the printer driver 22 of the client PC 2 transmits a PIF confirmation request to a printer driver data detection part 41, and indicated as "PDD detection part 41"). This printer driver data detection part 41 forms a second detection unit which detects copying of the binary image data of the plug-in file in the printer driver setting information storage area 23. When the PIF confirmation request is received from the UI display part 40, the printer driver data detection part 41 detects whether the binary image data of the plug-in file 15 are copied and stored in the printer driver setting information storage area 23 in step S8. When the printer driver data detection part 41 detects that the binary image data of the plug-in file 15 are stored in the printer driver setting information store area 23, the printer driver data detection part 41 transmits a write request to a writing part 43 (indicated as "PDD-PIF writing part 43"). This writing part 43 forms a second writing unit which writes the binary image data of the plug-in file stored in the printer driver setting information storage area 23 in an executable state within the HDD 21.

When the write request is received from the printer driver data detection part 41, the writing part 43 reads the binary image data of the plug-in file 15 stored in the printer driver setting information storage area 23, and writes the binary image data of the plug-in file 15 in the specific folder within the HDD 21 in step S9 so that the binary image data are usable by the printer driver 22 as a plug-in 25. Therefore, the plug-in file 25 executable by the printer driver 22 is installed in the HDD 21.

Further, in step S10, the UI display part 40 of the printer driver 22 transmits a PIF read request to a plug-in file read part 42 (indicated as "PIF read part 42"). This plug-in file read part 42 forms a read unit which reads the plug-in file written in the HDD 21 by the writing part 43 as a program. When the PIF read request is received from the UI display part 40, the plug-in file read part 42 reads (or loads) the data of the plug-in file 25 from the specific folder within the HDD 21 as a program to be executed by the printer driver 22 in step S11. The plug-in file read part 42 does not perform an operation if there is no plug-in file stored in the specific folder within the HDD 21.

By the operation of the printer driver 22, the functions of the plug-in file can be displayed by the UI display part 40, and the printer driver 22 can use the function of the plug-in file 15 installed in the server PC 1.

As described above, by merely installing a plug-in into the printer driver of the server PC 1 by only using available functions of printer drivers provided in advance by the OSs 10 and 20 of the server PC 1 and the client PC 2, it becomes possible for the client PC 2 to use the plug-in of the server PC 1 without having to interrupt the print service with respect to the client PC 2 by rebooting the print service of the server PC 1.

Next, a description will be given of a data format which is used when the writing part 33 as described above writes a plug-in file in the printer driver setting information storage area 13.

FIG. 4 illustrates indicating the data format which is used when the plug-in file is written in the printer driver setting information storage area 13 shown in FIG. 2.

As shown in FIG. 4, the writing part 33 may create a file including, for example, the binary image data of the plug-in file read from the HDD 11, a file name "PluginFile. DLL", and a file creation date "xxxx/xx/xx", and write this file in the printer driver setting information storage area 13.

Further, by the synchronizing process described above, the plug-in file 15 in the printer driver setting information storage area 13 of the server PC 1 is copied to the printer driver setting information storage area 23 of the client PC 2.

In the client PC 2, the writing part 43 executes the process concerning the file copied in the printer driver setting information storage area 23 by the server PC 1.

First, the writing part 43 writes the plug-in file written in the printer driver setting information storage area 23 on the HDD 21 when there is no plug-in data on the HDD 21.

Next, a description will be given of a case where the plug-in file 25 is already installed in the HDD 21 of the client PC 2. In this case, it is assumed that the file name and the file creation date of the plug-in file 25 are managed in the HDD 21.

Figure 5:
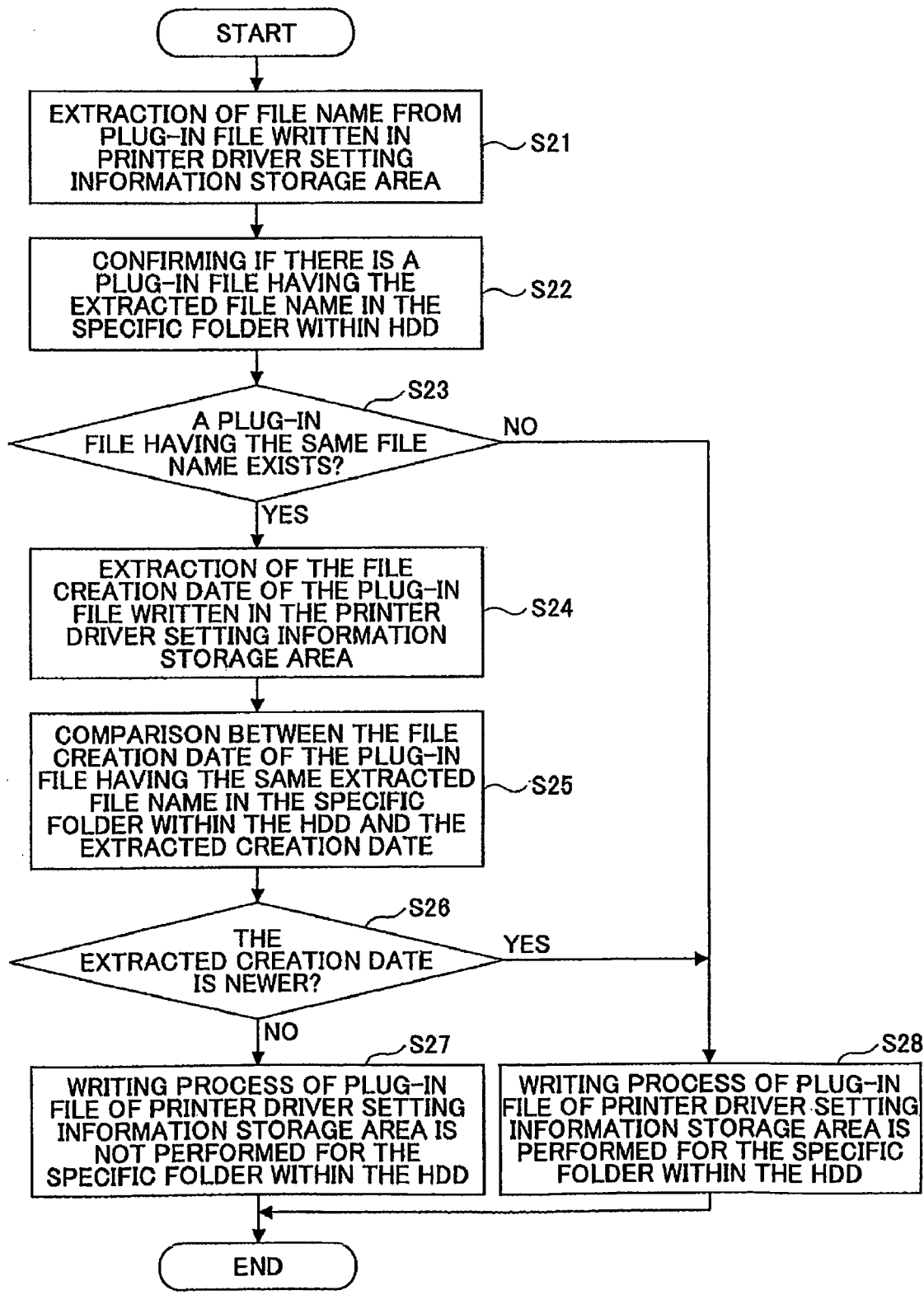
FIG. 5 is a flowchart for explaining a process of the printer driver data plug-in file writing part indicated in FIG. 2B.

FIG. 5 is a flowchart for explaining a process of the writing part 43 indicated in FIG. 2.

In step S21, the writing part 43 extracts a file name from a plug-in file written in the printer driver setting information storage area 23. In step S22, the writing part 43 searches for a plug-in file in the specific folder within the HDD 21 and having the same file name as the extracted file name. In step S23, the writing part 43 determines whether the plug-in file having the extracted file name exists in the specific folder within the HDD 21.

If a file having the extracted file name exists in the specific folder within the HDD 21 (yes) in step S23, the writing part 43 extracts the file creation date from the plug-in file written in the printer driver setting information storage area 23 in step S24. In step S25, a comparison is made between the file creation date of the plug-in file having the extracted file name in the specific folder within the HDD 21 and the extracted file creation date. In step S26, it is determined whether the file creation date of the plug-in file written in the printer driver setting information storage area 23 is newer (or more recent) than the creation date of the plug-in file having the extracted file name in the specific folder within the HDD 21. If the determination result in the step S26 is no, it is determined in step 27 that an update of the plug-in file written in the printer driver setting information storage area 23 has not been updated, and this process ends without performing the writing process in which the plug-in file written in the printer driver setting information storage area 23 is written in the specific folder within the HDD 21.

On the other hand, if the plug-in file having the extracted file name does not exist according to the determination of step 23 or the file creation date of the plug-in file written in the printer driver setting information storage area 23 is newer than that of the plug-in file having the extracted file name in the specific folder within the HDD 21 according to the determination of step 26, it is determined that the plug-in file has been updated. In this case, the process proceeds to step S28 to perform the writing process which writes the binary image data of the plug-in file written in the printer driver setting information storage area 23 in the specific folder within the HDD 21, and the process ends.

In this manner, the comparison is made between the copied file in the printer driver setting information storage area 23 and the plug-in file already written in the HDD 21, and then the determination is made to determine whether a plug-in file should be newly written. If a plug-in file having the same file name and newer file creation date compared to the copied file in the printer driver setting information storage area 23 which is already installed in the HDD 21, the writing process from the printer driver setting information storage area 23 is not performed, so that an unnecessary process is omitted.

Next, if there are plural plug-in files within the HDD 11, after creating each file having the data format indicated in FIG. 4, and each file may be compressed and combined into a single archive by the writing part 33, so that a single file is written in the printer driver setting information storage area 13. In this case, the plural plug-in files can be managed in a small storage area and the increase of the file size can be minimized by the file compression process. The writing part 33 forms a compressing unit which compresses binary image data of a plurality of plug-in files into a single archive when the writing part 33 writes the binary image data to the printer driver setting information storage area 13.

In this case where the file compression process is performed, in the writing part 43 of the client PC 2, the copied file in the printer driver setting information storage area 23 copied by the server PC 1 is decompressed, and the comparison is made between the file name and the file creation date of each of the files included in the decompressed file and the file name and the file creation date of the plug-in file written in the HDD 21. If each of the files included in the decompressed file having the same file name as and newer creation date compared to the plug-in file written in the HDD 21 exists in the printer driver setting information storage area 23, the writing process is performed to add the plug-in file of each of the files in the decompressed file into the HDD 21.

Further, when a plug-in file for each of the different types of OSs is installed in the HDD 11 of the server PC 1, the plug-in file may be written in the printer driver setting information storage area 13 as a file from which the type of OS is identifiable. In this case, it is possible to install in the client PC 2 only the plug-ins corresponding to the type of the OS running in the client PC 2. Hence, even when the plural client PCs 2 use different types of OSs, it is possible to make the same type of plug-in usable with respect to all of the client PCs 2.

In the server PC 1, when the binary image data of a plug-in file are written into the printer driver setting information store area 13, identification information which identifies a target OS with respect to the plug-in file may be added.

FIG. 6 is an explanatory drawing showing another data format to be used when a plug-in file is written in the printer driver setting information storage areas 13 and 23 shown in FIGS. 2A and 2B.

As shown in FIG. 6, the writing part 33 may create a file including, for example, the binary image data of the plug-in file read from the HDD 1, a file name "PluginFile.DLL", a file creation date "xxxx/xx/xx", and target OS information "Windows2000", and write this file in the printer driver setting information storage area 13.

Further, after plug-in files are created based on the format described above for every plural target OSs, each file is combined and compressed into a single archive, so that a single file is written in the printer driver setting information storage area 13.

According to the synchronizing process described above, the plug-in file in the printer driver setting information storage area 13 of the server PC 1 is copied to the printer driver setting information storage area 23 of the client PC 2.

In the client PC 2, the writing part 43 executes a process concerning the file copied in the printer driver setting information storage area 23.

In the following, a description will be given of a process which installs a plug-in file corresponding to the OS operated in the client PC 2.

Figure 7:
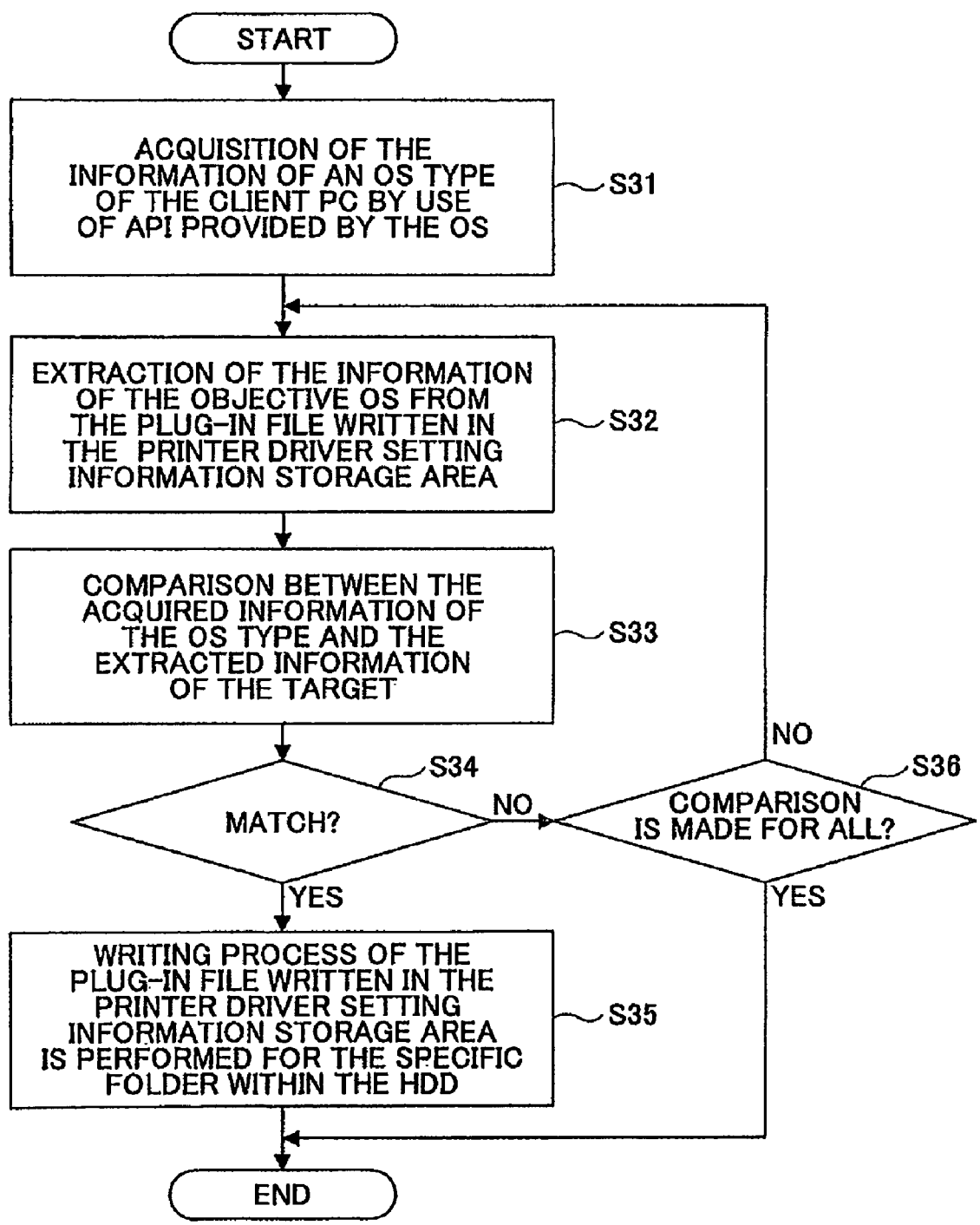
FIG. 7 is a flowchart for explaining another process of the printer driver data plug-in file writing part indicated in FIG. 2B.

FIG. 7 is a flowchart for explaining another process of the writing part 43 indicated in FIG. 2B.

A description will be given of a case where plug-in files written in the printer driver setting information storage area 23 including files which correspond to plural types of OSs.

The writing part 43 acquires information of the type of the OS the client PC 2 by use of the API (Application Program Interface) provided by the OS in step S31 (indicated as "S31"), and extracts the information of the target OS from the plug-in file written in the printer driver setting information storage area 23 in step S32. In step S33, the writing part 43 compares between the acquired information of the OS type described above and the extracted information of the target OS described above, and determines whether the acquired information and the extracted information match each other in step S34.

If the determination of step S34 determines to be mismatch, the process of step S36 determines whether each of the plural files concerning the OS in the plug-in file written in the printer driver setting information storage area 23 have been referred for all of the plural files concerning the OS. If all of the plural files have been referred, then the process is completed. If all of the plural files have not been referred, the process returns to step S32 and continues the comparison process described above.

Further, if the determination of step S34 determines to be match, then the matched plug-in file written in the printer driver setting information storage area 23 is written as an executable form in the specific folder within the HDD 21 with the writing process. The process is completed then.

Further, although comparison of file creation date is not performed in the above process, the writing process (plug-in file writing process) is performed only when the file creation date of the plug-in file written in the printer driver setting information storage area 23 is newer than that of the plug-in file installed in the HDD 21, in a similar manner to the process shown in FIG. 5.

In this way, the writing part 43 of the client PC 2 acquires the type of the OS of the client PC 2 and compares the type of the OS of the client PC 2 with the target OS of the plug-in file copied in the printer driver setting information storage area 23. The writing part 43 writes only the plug-in file of the type of the OS corresponding to the OS of the client PC 2 in the specific folder within the HDD 21 as executable plug-in file by use of the writing process.

Accordingly, the plug-in file corresponding to the OS of the client PC 2 can be installed.

Next, a description will be given for a deletion process of the plug-in file of the information processing system.

In a plug-in file deletion process, if the plug-in file detection part 31 detects that a plug-in file written in the specific folder within the HDD 11 is deleted, then the binary image data of the plug-in file corresponding to the plug-in file written in the printer driver setting information storage area 13 is deleted by use of the writing part 33, and the printer driver 12 of the server PC 1 copies the content of the printer driver setting information storage area 13 to the printer driver setting information storage area 23 of the client PC 2 by the synchronizing process described above. The writing part 33 forms a first deletion unit which detects deletion of a plug-in file installed in the HDD 11, and deletes from the printer driver setting information storage area 13 a plug-in file corresponding to the plug-in file deleted from the HDD 11. As a result, the binary image data of the plug-in file deleted from the printer driver setting information storage area 13 is also deleted from the printer driver setting information storage area 23.

Further, in the printer driver data detection part 41 of the client PC 2, an update of the content of the printer driver setting information storage area 23 is detected, and the writing part 43 deletes the plug-in file corresponding to the deleted binary image data of the plug-in file in the printer driver setting information storage area 23 from the specific folder of the HDD 21.

Figure 8:
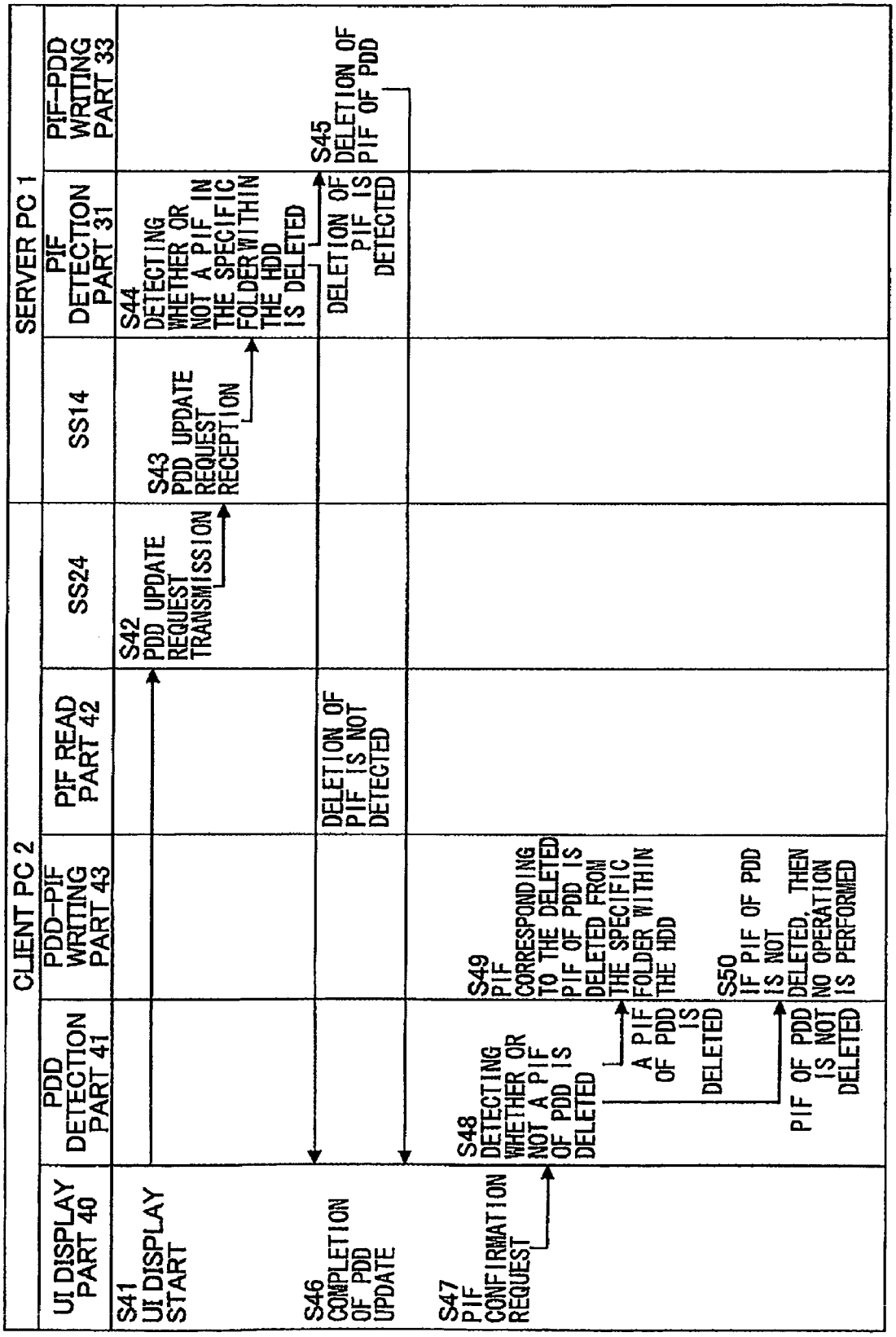
FIG. 8 is a sequence diagram of a deletion process which deletes a plug-in file of the client PC in the information processing system shown in FIG. 1.

FIG. 8 is a sequence diagram of a deletion process which deletes a plug-in file of the client PC 2 in the information processing system shown in FIG. 1.

When the UI display part 40 starts displaying a UI display on the display part (not shown) in step S41 (indicated as "S41") or when the plotting data forming part 44 performs a print process, the printer driver 22 of the client PC 2 transmits an update request (indicated as "PDD update request transmission") to the server PC 1 by the spooler service 24 (indicated as "SS24") in step S42.

When the server PC 1 receives the PDD update request transmitted from the client PC 2 by the spooler service 14 (indicated as "SS14") in step S43, the spooler service 14 transmits the PDD update request to the printer driver 12. When the printer driver 12 receives the PDD update request, the printer driver 12 detects whether a plug-in file (indicated as "PIF") in the specific folder within the HDD 11 is deleted by use of the plug-in file detection part 31 (indicated as "PIF detection part 31") in step S44.

When the plug-in file detection part 31 detects that the plug-in file 15 of the printer driver 12 in the specific folder within the HDD 11 is deleted, the plug-in file detection part 31 transmits a plug-in file deletion request for the printer driver setting information storage area 13 to the writing part 33 (indicated as "PIF-PDD writing part 33").

When the writing part 33 receives the plug-in file deletion request from the plug-in file detection part 31, the writing part 33 deletes the binary image data of the plug-in file corresponding to the plug-in file 15 deleted from the specific folder of the HDD 11 from the printer driver setting information storage area 13, and renews the content of the printer driver setting information storage area 13 in step S45.

The UI display part 40 of the client PC 2 displays "PDD update completion" in step S46. Further, the renewed content of the printer driver setting information storage area 13 is copied to the printer driver setting information storage area 23 of the client PC 2 by the function of the spooler service 14. As a result, the printer driver setting information storage area 13 and the printer driver setting information storage area 23 have the same content. Accordingly, the binary image data of the plug-in file corresponding to the deleted binary image data of the plug-in file in the printer driver setting information storage area 13 is also deleted from the printer driver setting information storage area 23.

In step S47, the UI display part 40 of the printer driver 22 of the client PC 2 transmits a PIF confirmation request to the printer driver data detection part 41 (indicated as "PDD detection part 41"). When the printer driver data detection part 41 receives the PIF confirmation request from the UI display part 40, the printer driver data detection part 41 detects whether the binary image data of the plug-in file in the printer driver setting information storage area 23 is deleted in step S48. When the printer driver data detection part 41 detects deletion, the printer driver data detection part 41 transmits a plug-in file deletion request to the writing part 43 (indicated as "PDD-PIF writing part 43").

When the plug-in file deletion request is received from the printer driver data detection part 41, the writing part 43 deletes the plug-in file corresponding to the binary image data of the plug-in file deleted from the printer driver setting information storage area 23 from the specific folder of the HDD 21 in step S49. This writing part 43 forms a second deletion unit which detects deletion of the binary image data of the plug-in file stored in the printer driver setting-information storage area 23, and deletes from the HDD 21 a plug-in file corresponding to the plug-in file deleted from the printer driver setting information storage area 23.

Further, if no plug-in file is deleted from the specific folder of the HDD 21, then the PIF read part 42 does not perform an operation.

In this way, the plug-in file corresponding to that deleted from the server PC 1 can be also deleted automatically from the client PC 2.

Further, the process, which the printer driver 12 of the server PC 1 as described above writes the binary image data of the plug-in file in the printer driver setting information storage area 13, may be performed by an installer installing a plug-in file on the HDD 11 of the server PC 1 when the plug-in file is installed in the specific folder within the HDD 11.

The information processing system, the information processing method and the computer-readable recording medium according to the present invention can be applied to most apparatuses which include personal computer using printer drivers.

The present invention is not limited to the specifically disclosed embodiments, and variations and modifications may be made without departing from the scope of the present invention.

The present application is based on Japanese priority application No. 2008-039220 filed Feb. 20, 2008, the entire contents of which are hereby incorporated herein by reference.

What is claimed is:

1. An information processing system comprising:
   a server apparatus; and
   at least one client apparatus coupled to and communicatable with the server apparatus via a network;
   said server apparatus comprising:
      a first storage unit;
      a first detection unit configured to detect installing of a plug-in file in the first storage unit;
      a first storage area;
      a first writing unit configured to write binary image data of the plug-in file detected by the first detection unit to the first storage area; and
      a copy unit configured to copy the binary image data of the plug-in file written in the first storage area by the first writing unit to the client apparatus,
   said client apparatus comprising:
      a second storage unit;
      a second storage area;
      a second detection unit configured to detect copying of the binary image data of the plug-in file in the second storage area;
      a second writing unit configured to write the binary image data of the plug-in file stored in the second storage area in an executable state within the second storage unit; and
      a read unit configured to read the plug-in file as a program from the second storage unit.

2. The information processing system as claimed in claim 1, wherein the second writing unit of the client apparatus compares the plug-in file stored in the second storage area and a plug-in file already existing in the second storage unit, and the read unit reads the plug-in file from the second storage unit if updating contents of the compared plug-in files are the same.

3. The information processing system as claimed in claim 2, wherein the second writing unit of the client apparatus compares a file name and a creation date of the plug-in file stored in the second storage area and a file name and a creation name of a plug-in file already existing in the second storage unit in order to determine if updating contents of the compared plug-in files are the same.

4. The information processing system as claimed in claim 1, wherein the server apparatus comprises a compressing unit configured to compress binary image data of a plurality of plug-in files into a single archive when the first writing unit writes the binary image data to the first storage area.

5. The information processing system as claimed in claim 1, wherein the first writing unit writes the binary image data of the plug-in file to the first storage area in manner which enables identification of an operating system in which the plug-in file operates.

6. The information processing system as claimed in claim 1, wherein:
   the server apparatus comprises a first deletion unit configured to detect deletion of a plug-in file installed in the first storage unit, and to delete from the first storage area a plug-in file corresponding to the plug-in file deleted from the first storage unit, so that the copy unit copies contents of the first storage area to the second storage area of the client apparatus; and
   the client apparatus comprises a second deletion unit configured to detect deletion of the binary image data of the plug-in file stored in the second storage area, and to delete from the second storage unit a plug-in file corresponding to the plug-in file deleted from the second storage area.

7. The information processing system as claimed in claim 1, wherein the second writing unit of the client apparatus does not write the binary image data of the plug-in file stored in the second storage area in the executable state within the second storage unit if the plug-in file stored in the second storage area is already stored in the second storage unit.

8. The information processing system as claimed in claim 1, wherein the first storage area of the server apparatus and the second storage area of the client apparatus form a printer driver data area.

9. An information processing method comprising:
   detecting installing of a plug-in file in a first storage unit within a server apparatus;
   writing binary image data of the detected plug-in file to a first storage area within the sever apparatus;
   copying the binary image data of the plug-in file written in the first storage area to a second storage area within at least one client apparatus which is coupled to and communicatable with the server apparatus via a network;
   detecting copying of the binary image data of the plug-in file in the second storage area;
   writing the binary image data of the plug-in file stored in the second storage area in an executable state within a second storage unit within the client apparatus; and
   reading the plug-in file as a program from the second storage unit.

10. The information processing method as claimed in claim 9, wherein:
    the writing of the binary image data of the plug-in file stored in the second storage area within the second storage unit includes comparing the plug-in file stored in the second storage area and a plug-in file already existing in the second storage unit; and
    the reading of the plug-in file as a program from the second storage unit includes reading the plug-in file from the second storage unit if updating contents of the compared plug-in files are the same.

11. The information processing method as claimed in claim 9, further comprising:
    detecting deletion of a plug-in file installed in the first storage apparatus, and deleting from the first storage area a plug-in file corresponding to the plug-in file deleted from the first storage unit, so that the copying copies contents of the first storage area to the second storage area of the client apparatus; and
    detecting deletion of the binary image data of the plug-in file stored in the second storage area, and deleting from the second storage unit a plug-in file corresponding to the plug-in file deleted from the second storage area.

12. A non-transitory computer-readable recording medium encoded with computer executable instructions performing, when executed by a computer, the following steps of;
    a first detection procedure detecting installing of a plug-in file in a first storage unit within a server apparatus;
    a first writing procedure writing binary image data of the plug-in file detected by the first detection procedure to a first storage area within the server apparatus;
    a copy procedure copying the binary image data of the plug-in file written in the first storage area by the first writing procedure to at least one client apparatus which is coupled to and is communicable with the server apparatus via a network;
    a second detection procedure detecting copying of the binary image data of the plug-in file in the second storage area;
    a second writing procedure writing the binary image data of the plug-in file stored in the second storage area in an executable state within a second storage unit of the client apparatus; and
    a read procedure reading the plug-in file as a program from the second storage unit.

13. The non-transitory computer-readable recording medium as claimed in claim 12, wherein the second writing procedure compares the plug-in file stored in the second storage area and a plug-in file already existing in the second storage unit, and the read procedure reads the plug-in file from the second storage unit if updating contents of the compared plug-in files are the same.

14. The non-transitory computer-readable recording medium as claimed in claim 13, wherein the second writing procedure compares a file name and a creation date of the plug-in file stored in the second storage area and a file name and a creation name of a plug-in file already existing in the second storage unit in order to determine if updating contents of the compared plug-in files are the same.

15. The non-transitory computer-readable recording medium as claimed in claim 12, wherein the computer executable instructions further perform the following step of:
    a compressing procedure compressing binary image data of a plurality of plug-in files into a single archive when the first writing procedure writes the binary image data to the first storage area.

16. The non-transitory computer-readable recording medium as claimed in claim 12, wherein the first writing procedure writes the binary image data of the plug-in file to the first storage area in manner which enables identification of an operating system in which the plug-in file operates.

17. The non-transitory computer-readable recording medium as claimed in claim 12, wherein the computer executable instructions further perform the following steps of:
    a first deletion procedure detecting deletion of a plug-in file installed in the first storage unit, and deleting from the first storage area a plug-in file corresponding to the plug-in file deleted from the first storage unit, so that the copy procedure copies contents of the first storage area to the second storage area of the client apparatus; and
    a second deletion procedure detecting deletion of the binary image data of the plug-in file stored in the second storage area, and deleting from the second storage unit a plug-in file corresponding to the plug-in file deleted from the second storage area.

18. The non-transitory computer-readable recording medium as claimed in claim 12, wherein the second writing procedure does not write the binary image data of the plug-in file stored in the second storage area in the executable state within the second storage unit if the plug-in file stored in the second storage area is already stored in the second storage unit.

19. The non-transitory computer-readable recording medium as claimed in claim 12, wherein the first storage area of the server apparatus and the second storage area of the client apparatus form a printer driver data area.

20. The non-transitory computer-readable recording medium as claimed in claim 12, wherein the first storage area of the server apparatus and the second storage area of the client apparatus store data shared between the server apparatus and the client apparatus.

* * * * *